United States Patent
Tomlinson et al.

(10) Patent No.: US 9,166,957 B2
(45) Date of Patent: Oct. 20, 2015

(54) DIGITAL FILE AUTHENTICATION USING BIOMETRICS

(71) Applicants: Martin Tomlinson, Devon (GB); Cen Jung Tjhai, London (GB); Andersen Cheng, London (GB)

(72) Inventors: Martin Tomlinson, Devon (GB); Cen Jung Tjhai, London (GB); Andersen Cheng, London (GB)

( * ) Notice: Subject to any disclaimer, the term of this patent is extended or adjusted under 35 U.S.C. 154(b) by 0 days.

(21) Appl. No.: 13/865,844

(22) Filed: Apr. 18, 2013

(65) Prior Publication Data

US 2013/0283035 A1  Oct. 24, 2013

(30) Foreign Application Priority Data

Apr. 19, 2012  (GB) .................................. 1206863.1

(51) Int. Cl.
| | | |
|---|---|---|
| *H04L 29/06* | (2006.01) | |
| *H04L 9/32* | (2006.01) | |
| *G06F 21/64* | (2013.01) | |

(52) U.S. Cl.
CPC ............ *H04L 63/0428* (2013.01); *G06F 21/64* (2013.01); *H04L 9/3231* (2013.01); *H04L 9/3239* (2013.01); *H04L 9/3247* (2013.01); *H04L 63/0861* (2013.01); *H04L 63/123* (2013.01)

(58) Field of Classification Search
CPC .............. H04L 63/0428; H04L 63/123; H04L 63/0861; H04L 9/3247; H04L 9/3231; H04L 9/3239; G06F 21/64
See application file for complete search history.

(56) References Cited

U.S. PATENT DOCUMENTS

| | | | |
|---|---|---|---|
| 6,202,151 B1 | 3/2001 | Musgrave et al. | |
| 6,553,494 B1 * | 4/2003 | Glass | 713/186 |
| 7,606,768 B2 | 10/2009 | Graubart et al. | |

(Continued)

FOREIGN PATENT DOCUMENTS

| | | |
|---|---|---|
| DE | 102008029608 A1 | 12/2009 |
| GB | 2456509 A | 7/2009 |

(Continued)

OTHER PUBLICATIONS

Menezes et al. "Handbook of Applied Cryptography." Chapter 8, "McEliece public key encryption," pp. 283-319. CRC Press, Oct. 1996. Retrieved from http://www.cacr.math.uwaterloo.ca/hac/about/chap8.pdf.

Rivest et al. "A Method for Obtaining Digital Signatures and Public-Key Cryptosystems." Communications of the ACM 21(2):120-126 (1978).

(Continued)

*Primary Examiner* — Justin T Darrow
(74) *Attorney, Agent, or Firm* — Procopio Cory Hargreaves & Savitch LLP

(57) ABSTRACT

This invention provides a means of authenticating digital files without the need for a central trusted authority. A message digest of one or more digital files is calculated, preferably using a cryptographic hash function and all or part of the digest value is implanted into one or more biometric information files produced by the originator of the digital files or a trusted third party. The recipient of the digital files and biometric information files is able to determine all or part of the digest value from the biometric information files, check that this corresponds to the calculated message digest of one or more digital files as well as check the identity of the originator or trusted third party. In further embodiments the biometric information files contain all or part of a digital signature generated by the originator of the digital files or a trusted third party. The invention may be used in many applications including the distribution of public encryption keys.

13 Claims, 10 Drawing Sheets

Nested authentication with succession of partial hash values and biometric information files

(56) References Cited

U.S. PATENT DOCUMENTS 7,689,832 B2 * 3/2010 Talmor et al. .............. 713/186
8,060,922 B2 * 11/2011 Crichton et al. .............. 726/9

FOREIGN PATENT DOCUMENTS

| GB | 2473154 A | 3/2011 | | |
|----|-----------|--------|---|---|
| WO | 0223796 A1 | 3/2002 | | |
| WO | 02080116 A1 | 10/2002 | | |
| WO | WO 2007122726 A1 * | 11/2007 | .............. | G06F 21/20 |

OTHER PUBLICATIONS

FIPS PUB 186-3, Digital Signature Standard (DSS), Federal Information Processing Standards Publication. Jun. 2009, 131 pages.

McEliece. "A Public-Key Cryptosystem Based on Algebraic Coding Theory." DSN Progress Report 42-44. pp. 114-116 (Jan. and Feb. 1978).

Combined Search and Examination Report under Sections 17 & 18(3) for related GB Patent Application No. GB1206863.1, dated Jun. 19, 2012, in 5 pages.

* cited by examiner

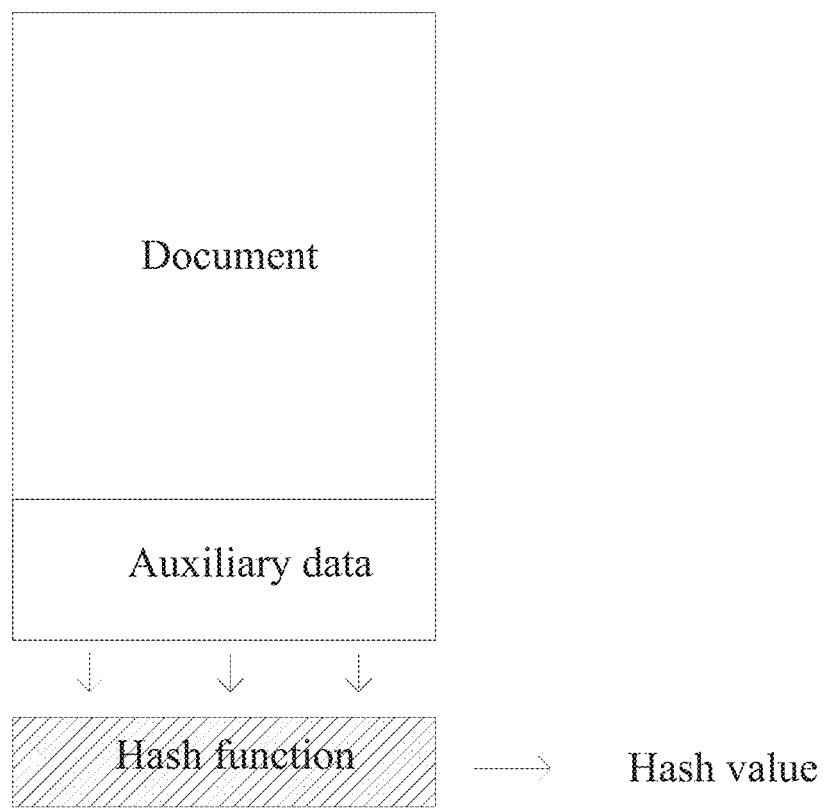
Figure 1: Document, auxillary data and hash

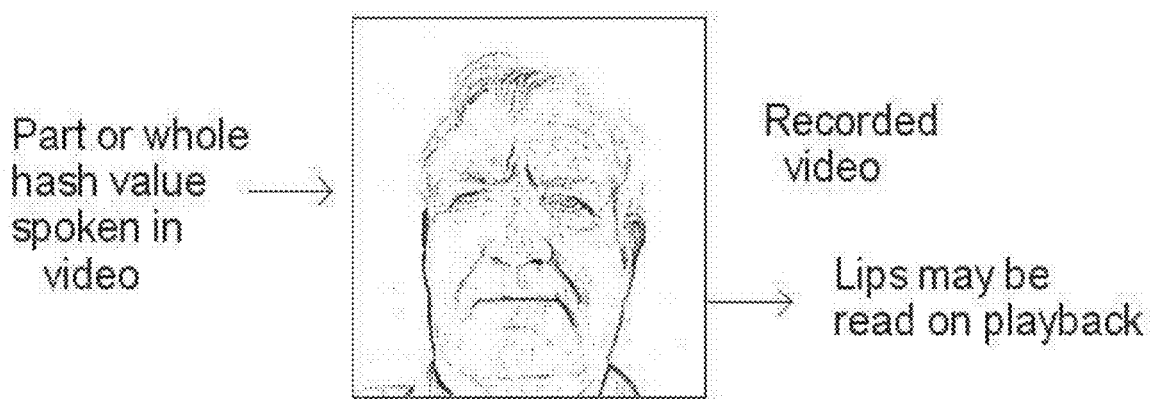
Figure 2: Authentication video

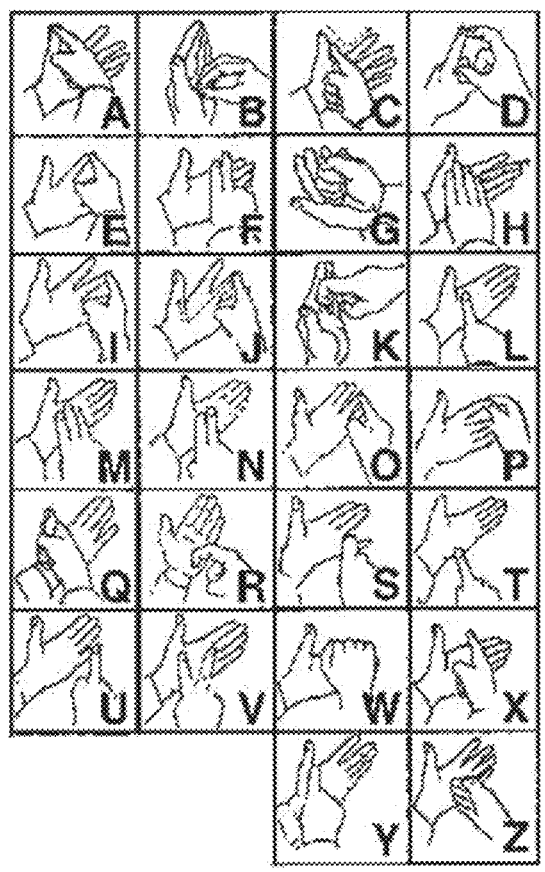
Figure 3: Hand gestures alphabet

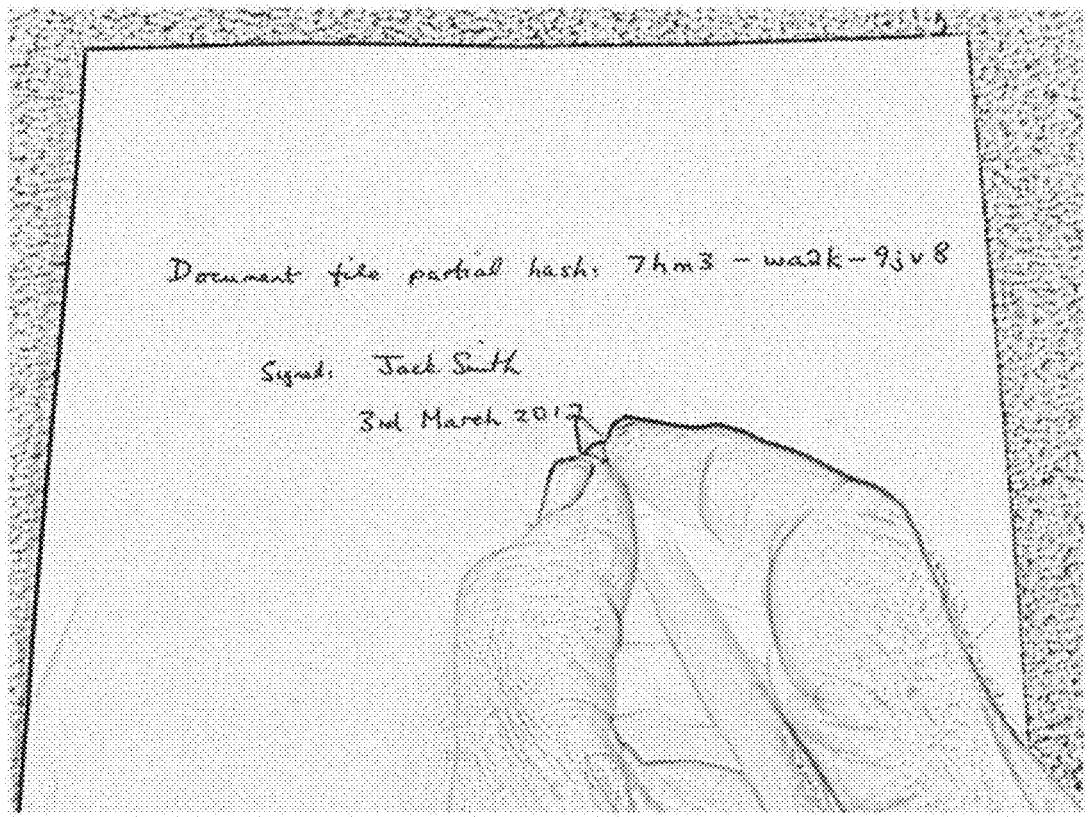
Figure 4: Handwritten authentication using partial hash value

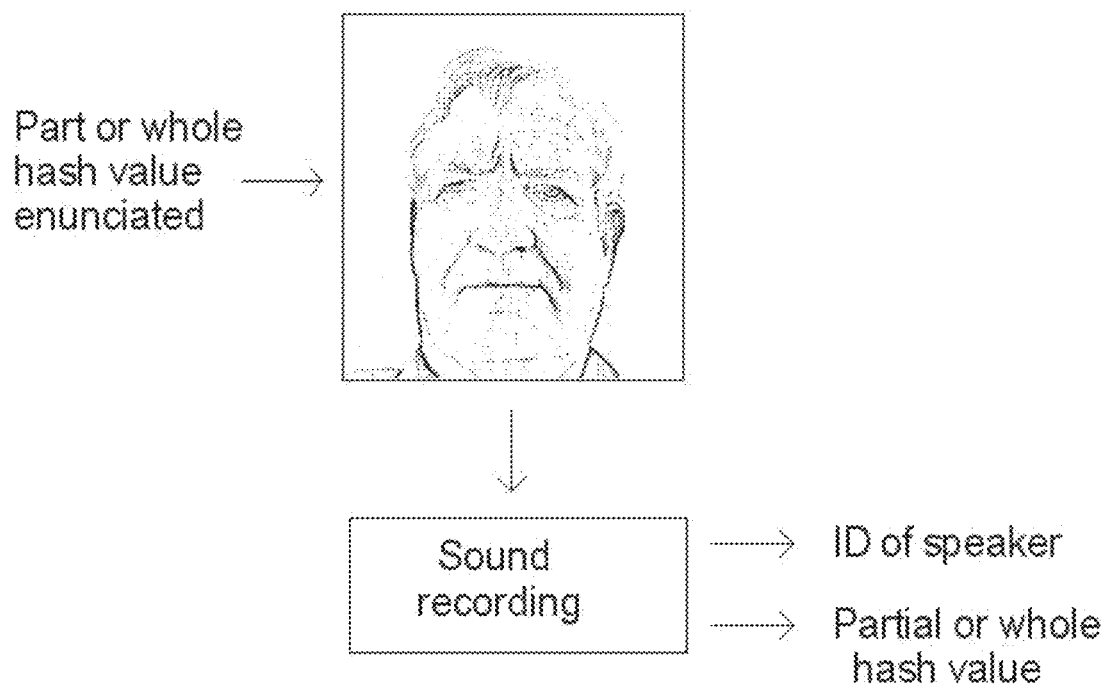
Figure 5: Sound recording of partial hash value

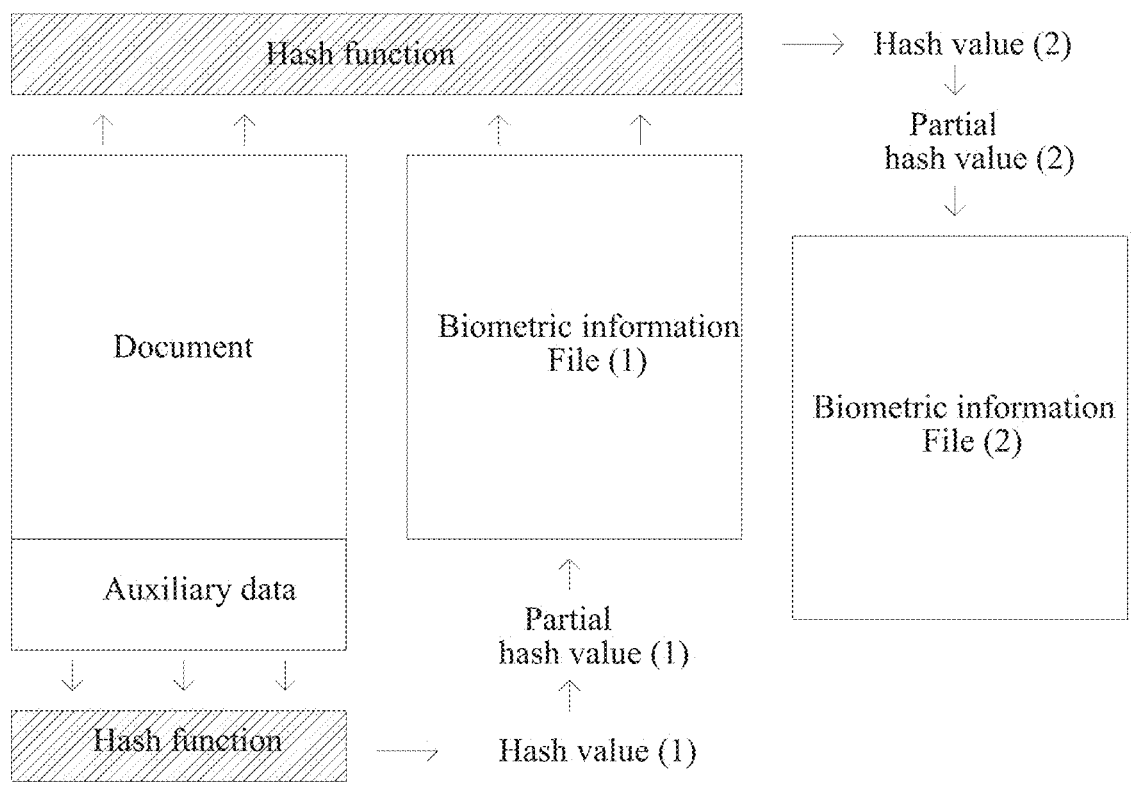
Figure 6: Nested authentication with succession of partial hash values and biometric information files

Figure 7: iPhone App S2S

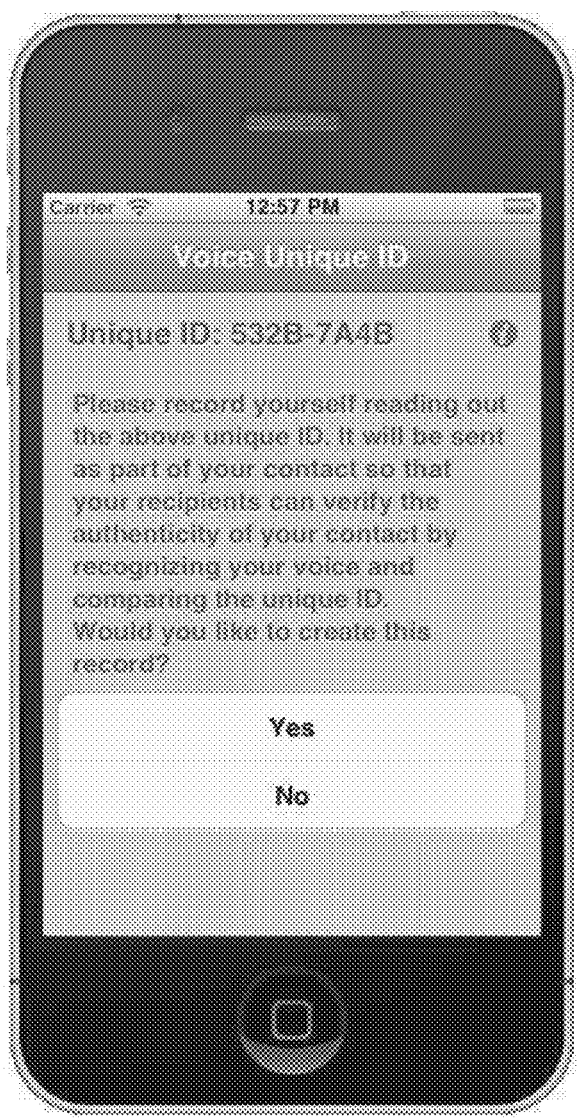
Figure 8: iPhone App S2S invitation to record partial hash

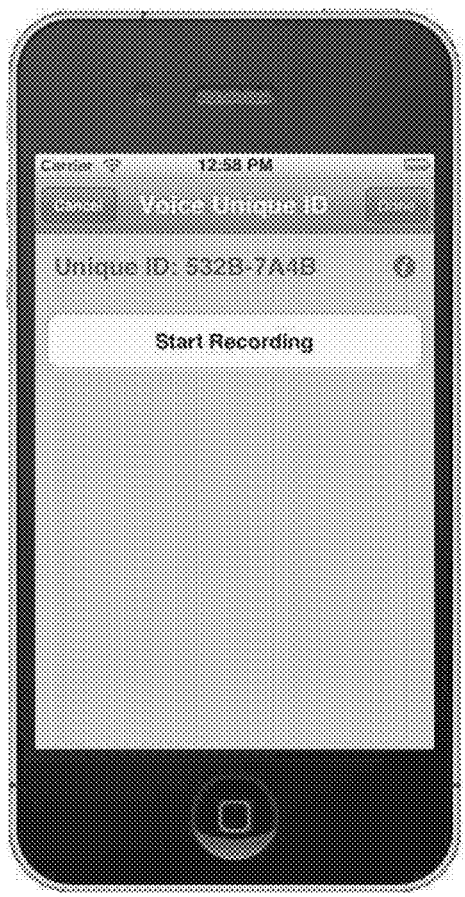
Figure 9: iPhone App S2S start recording partial hash

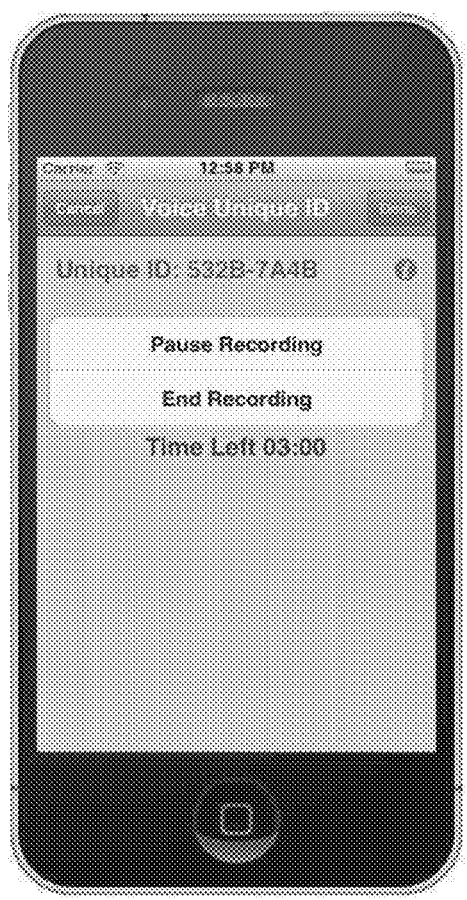
Figure 10: iPhone App S2S end recording partial hash

DIGITAL FILE AUTHENTICATION USING BIOMETRICS

CROSS-REFERENCE TO RELATED APPLICATIONS

This application claims priority under 35 U.S.C. §119 to United Kingdom patent application GB1206863.1, filed on Apr. 19, 2012, the disclosure of which is incorporated herein by reference.

INTRODUCTION AND BACKGROUND

Providing proof that a digital file was originated by a particular user and has not been tampered with since or substituted with a forgery is not an easy problem to solve. Digital files of particular importance are public keys, the public domain part of asymmetric encryption keys since more than one confidential information file is likely to be encrypted using these. If a public key is a forgery, the forger will hold the corresponding private key and be able to access all of the confidential information encrypted.

Authentication of public keys is traditionally done using certificates whereby a trusted third party (TPA) acts as a Certification Authority (CA) and publishes public keys and their associated owner's identities (ID's) in the form of certificates. These certificates are digitally signed using the private key of the CA so that the authenticity of a certificate may be checked by anyone using the public key of the CA.

The binding of the ID with the public key is the critical issue. There are several problems with the CA approach. A central server has to be constantly available, accessible under varying traffic conditions and hacker proof. Strict security procedures need to be followed by the CA to check ID's before issuing each certificate. Also procedures need to be in place to prevent tampering of certificates. The CA has to have credible trustworthiness. Apart from checking the digital signature a user cannot directly verify the associated ID of a public key.

The specification below describes a method in which a recipient can authenticate by themselves a public key (or any digital file) and the associated ID by using biometric information and provides multi-factor authentication as recommended by government regulators (for example the US Federal Financial Institutions Examination Council). The multi-factors are something known (a secret number or password), something owned (a device, a computer or piece of equipment) and various types of biometric information. The prior art describes different authentication methods from the specification with this aim. As described in U.S. Pat. No. 7,606,768 B2 by Graubart et al [1], the originator of a document generates a voice message which includes their ID and a secret number, a PIN. The voice message is appended to the document to form a data file. A polynomial hash of the data file is calculated and encrypted using the PIN as the basis of the encryption key. The recipient is able to authenticate the originator's ID by recognising the originator's voice in the voice message. The document is bound to the originator through the PIN encrypted hash. Provided the PIN is kept secret, a forger cannot change the document without invalidating the encrypted hash.

The disadvantage of this method described in U.S. Pat. No. 7,606,768 B2 is that while the biometric content provides strong binding to the originator's ID, the binding to the document is weak in that if a forger is able to learn the PIN then the forger can replace the document with a forged document, calculate a new encrypted hash and utilise the originator's voice message to provide authentication.

In the method described below a document is bound to the originator by making the biometric authentication information a function of the document which is not the case for U.S. Pat. No. 7,606,768 B2.

OUTLINE DESCRIPTION OF THE INVENTION

One or more digital files which contain media information such as documents, or numerical data such as encryption keys are aggregated into a single file, termed the source file and a message digest of this source file is calculated. The message digest function used is ideally a cryptographic hash function such as the Secure Hash Algorithm (SHA) [2] with the property that it is practically impossible to generate a different source file with the same hash value as the original. A biometric information file is generated by the originator of the source file or by a trusted third party, likely to be known to the intended recipient of the source file. One or more biometric information files are generated in such a way that all or part of the message digest value is contained within each file. The recipient of a biometric information file and the source file is able to determine the identity of the originator, or trusted third party, and all or part of the message digest value from the biometric information file and check that this corresponds to the calculated message digest of the received source file.

In a further embodiment of the invention the source file is digitally signed by the originator, or by a trusted third party, using a cryptographic key and all or part of the digital signature is contained in a biometric information file.

BRIEF DESCRIPTION OF THE DRAWINGS

FIG. 1 is a block diagram illustrating of use of a hash function in accordance with aspects of the invention.

FIG. 2 is a block diagram illustrating of use of an authentication video in accordance with aspects of the invention.

FIG. 3 is a lookup table of hand gestures and letters of the alphabet in accordance with aspects of the invention.

FIG. 4 is an illustration of use of a handwritten authentication in accordance with aspects of the invention.

FIG. 5 is an illustration of use of a sound recording authentication in accordance with aspects of the invention.

FIG. 6 is a block diagram illustrating of use of a hash function with biometric information in accordance with aspects of the invention.

FIGS. 7-10 are illustrations of a mobile phone application for authentication in accordance with aspects of the invention.

DETAILED DESCRIPTION

The invention is described by way of example in which the source file is a document such as a public encryption key appended with auxiliary data. Auxiliary data may consist of the document originator's ID, a time stamp, type of document and any other data. As shown in FIG. 1 a hash function such as the Secure Hash Algorithm (SHA) is used to calculate the message digest value of the document plus auxiliary data. For a particular document and auxiliary data consider that the hash value is denoted by hash value represented as an alphanumeric string. An example is 7km3wa2k9jv8em395m7b3. The partial hash value is denoted as hash value_{partial} and consists of all or part of hash value. Using the same alphanumeric string example the partial hash value, limited to the first 12 characters is 7km3wa2k9jv8.

There are a number of different methods in which a biometric information file may contain the partial hash value, hash value_{partial}. In one embodiment, as illustrated in FIG. 2 the originator, or a trusted third party produces a video recording of his/her face with their lips clearly visible, and enunciates the partial hash value so that the partial hash value may be discerned on replay of the video recording. The source file and video recording file are subsequently communicated to the recipient. It is an advantage to encrypt the source file and video recording file prior to communication as this makes tampering more difficult while the files are in transit. The recipient is able to authenticate the ID of the originator, or trusted third party by recognising the person in the video recording by recognising their face, and/or recognising their voice, and/or recognising their gestures, on replay. The recipient is also able to authenticate the source file by calculating the hash value of the source file, forming a partial version, hash value_{partial}, and verifying that this is the same as the hash value_{partial} enunciated in the video recording. If a cryptographic hash function is used it is practically impossible to produce a digital file with a prescribed hash value. It follows that it is practically impossible to produce a fake digital file with the same hash value as the original source file. Further corroboration of the hash value may be provided by reading the lips of and/or by recognising particular voice patterns of the originator, or trusted third party in the video recording to correlate with the spoken hash value_{partial}.

The partial hash value may be communicated by other types of biometric information file. The partial hash value may be communicated by means of gestures of the body recorded in the video recording. As an example, signing using a language utilised by hearing-impaired people may be used. FIG. 3 shows a look up table for hand gestures and letters of the alphabet. Calculating the message digest of the source file using the cryptographic hash function SHA 256 [2] will produce a hash value 256 bits long. As there are 26 letters in the alphabet, a combination of any 3 letters provides a total of 26*26*26=17576 combinations. A look-up table may be constructed by assigning $2^{14}$=16384 of these 3 letter combinations to each of the 16384 different bit patterns of length 14 bits. Correspondingly a hash value_{partial} formed from the first 84 bits of the 256 bit hash value may be represented by 6 three letter sequences, a total of 18 hand gestures. An example of such a hash value_{partial} is the sequence KWY KCO SSP NWF PPE XIG.

A biometric information file can also consist of a video recording or photograph of the originator, or trusted third party writing the hash value_{partial} on a piece of paper and may also include the originator, or trusted third party signing and dating the said piece of paper. An illustration of this is shown in FIG. 4.

In another embodiment the person providing the biometric authentication information and this may be the originator of the document file or a trusted third party, makes a sound recording of themselves speaking the partial hash value as illustrated in FIG. 5. Authentication is provided by the recipient calculating the hash value of the document file, deriving the partial hash value, recognising the person's voice in the sound recording and hearing the same partial hash value being spoken by that person in the sound recording.

In a further embodiment additional biometric authentication information may be provided by a series of trusted third parties in a nested authentication arrangement which may be useful in cases where the originator of the document is not expected to be known to the intended recipient. As shown in FIG. 6 the document file and the originator's biometric information containing the hash value_{partial}(1) are combined together and the hash of this composite file is calculated, with the result denoted as hash value(2). The truncated version of this denoted as hash value_{partial}(2) is included in one or more biometric information files produced by the trusted third party. As described above a biometric information file can consist of a video recording of the trusted third party enunciating the hash value_{partial}(2); or communicating the hash value_{partial}(2) value by bodily gestures, including hand gestures; a video recording or photograph of the trusted third party writing the hash value_{partial}(2) on a piece of paper and signing their name; or a sound recording of the trusted third party enunciating the hash value_{partial}(2) or a combination thereof. It is apparent that the nesting procedure may continue resulting in a series of trusted third parties authenticating previously authenticated composite files, producing biometric information files each conveying a hash value_{partial} authenticating the previous composite file so that at the $j^{th}$ step, the $(j-1)^{th}$ trusted third party produces one or more biometric information files (j) each of which include hash value_{partial}(j). This arrangement is similar to the chain-of-trust in Public-Key Infrastructure.

In another embodiment of the invention a digital signature of the source file is generated using the hash value as input to the signature. Part of the digital signature is appended to the source file and the rest of the digital signature is communicated in one or more biometric information files. This embodiment is described by way of example using the RSA digital signature standard given in the Digital Signature Standard [4]. The public key which is used by the recipient to verify the digital signature consist of integers n and e. The private key used by the originator, or trusted third party consists of the integers n and d. The digital signature is a calculated integer given by $\sigma$=hash value$^d$ which is split into two parts, $\sigma_l$ and $\sigma_r$ such that sigma is equal to $\sigma_l$ appended with $\sigma_r$. An example is sigma=8249567123995334 with $\sigma_l$=82495671239 and $\sigma_r$=95334. The integer $\sigma_r$ is communicated in one or more biometric information files and $\sigma_l$ is appended to the source file. The reason for subdividing $\sigma$ into two parts is that typically $\sigma$ is too large an integer to be communicated practically in a biometric information file. The integer $\sigma_r$ may be communicated directly as an integer or represented as an alphanumeric string which is usually shorter. The recipient determines the integer $\sigma_r$ from one or more received biometric files and constructs the integer $\sigma$ using the appended source file and uses the public key to calculate m^=$\sigma^e$ modulo n. The source file is verified by the digital signature if m^ is equal to hash value calculated by hashing the received source file.

Another method of digitally signing a source file is to use the McEliece public key encryption system [5] with additional features as described in UK patent GB2473154 [6]. This embodiment is described by way of example using a short code length of 32 bits. Practical arrangements may use codes of longer length such as 65536 bits. The public key is a reduced echelon binary generator matrix of a scrambled, permuted Goppa code, an example of length 32 bits is shown below

```
1 0 0 0 0 0 0 0 0 0 0 0 0 0 0 1 0 1 1 0 1 0 1 0 1 0 0 0 1 1 1 1
0 1 0 0 0 0 0 0 0 0 0 0 0 0 1 0 0 0 1 0 0 1 0 0 0 1 0 0 1 0 1 1 1 0
```

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
|0|0|1|0|0|0|0|0|0|0|0|0|0|0|1|1|0|0|1|0|1|1|1|1|0|0|1|1|0|0|0|0|
|0|0|0|1|0|0|0|0|0|0|0|0|1|1|1|0|1|0|1|0|0|0|0|1|0|1|0|0|0|0|1|0|
|0|0|0|0|1|0|0|0|0|0|0|0|1|1|0|1|1|1|1|0|1|0|0|1|0|0|0|1|0|0|0|1|
|0|0|0|0|0|1|0|0|0|0|0|0|1|0|0|0|1|0|0|1|1|0|1|1|1|1|1|1|1|1|0|1|
|0|0|0|0|0|0|1|0|0|0|0|1|1|0|0|0|1|0|1|1|0|0|1|0|0|1|1|0|0|1|
|0|0|0|0|0|0|0|1|0|0|0|1|1|1|0|1|1|1|1|1|0|0|0|1|1|0|0|1|1|1|
|0|0|0|0|0|0|0|1|0|0|0|0|0|0|0|1|1|0|1|0|0|1|1|0|1|1|0|0|1|1|
|0|0|0|0|0|0|0|0|1|0|0|1|0|0|1|1|1|0|0|1|0|1|1|1|0|0|1|0|1|0|0|
|0|0|0|0|0|0|0|0|0|1|0|0|0|0|1|1|0|1|0|1|0|1|1|1|1|0|0|0|1|1|1|
|0|0|0|0|0|0|0|0|0|0|1|0|0|0|1|0|1|0|1|0|1|1|1|1|1|0|1|0|1|1|0|

In this example the binary error correcting code has 20 parity bits and 12 information bits and can correct up to 4 errors in any of the 32 bits. The private key consists of the Goppa code used to generate this generator matrix, the scrambler and permutation matrices. Consider that the source file is appended with an integer index and hashed using a secure hash function such as SHA256 producing a hash value whose first 20 bits are:
01001011110010110011

The originator, or trusted third party, uses their private key, considering the 20 bit pattern as a syndrome of the error correcting Goppa code, to find the 4 bit error pattern which produces this syndrome value. This code can correct 4 bit errors so a 4 bit error pattern is determined. In general Goppa codes are represented as an (n, k, t) code and at bit error pattern is determined. Returning to the example, it is found that errors in the $2^{nd}$, $7^{th}$, $24^{th}$ and $30^{th}$ bit positions produces a syndrome equal to
01001011110010110011

This may be verified by determining the parity bits from the generator matrix above for an input vector with 1's in the error positions:
01000010000000000000000100000100

It is found that the 20 parity bits are:
01001011110010110011

The same as the first 20 bits of the hash value.

Having found the error pattern using the private key, the originator, or trusted third party, produces a biometric information file which contains the information of the bit error positions. For example the originator, or trusted third party could produce a video recording of themselves enunciating the numbers 2, 7, 24 and 30.

The recipient receives the source file, the index value and one or more biometric information files. From the biometric information files, the recipient determines the digital signature, which is the numbers 2, 7, 24 and 30 and checks the ID of the person doing the authentication. The recipient then uses the public key, the generator matrix to calculate the syndrome for bit errors in positions 2, 7, 24 and 30. The recipient appends the source file with the index value and uses the hash function SHA256 to determine the hash value. The recipient determines that the digital signature is valid if the first 20 bits of the hash value is equal to the calculated syndrome.

The basis of this digital signing method is that it is practically impossible to determine an error pattern from a syndrome unless it is known from the huge number of possibilities which particular Goppa code was used to construct the generator matrix. That is, it is practically impossible unless the private key is known. However given the digital signature, the error pattern, it is straightforward to calculate the syndrome.

To construct the digital signature it is necessary to have an integer index appended to the source file because not all syndrome values correspond to error patterns that the Goppa code can correct. In practice different index values are tried until a correctable syndrome is found.

A more realistic example uses a Goppa code with parameters (131072,130987,11) which can correct 5 errors. With these parameters, the syndrome is 85 bits long giving an 85 bit digital signature and on average 120 different index values need to be tried by the signer before a correctable error pattern is found.

In another embodiment the person providing the biometric authentication information instead of communicating directly the partial hash value or partial digital signature in a video recording or sound recording, the partial hash value or partial digital signature is communicated indirectly using a codebook look up table where a prearranged phrase or word is substituted, or used in addition, for each character or symbol representing the partial hash value or partial digital signature. As an example for a partial hash value represented as an alphanumeric string qn4c5te9

The codebook look up table may be as in Table 1 below.

TABLE 1

Codebook look up table

| Character | Phrase |
|---|---|
| 4 | The sky is blue |
| 5 | A fast train |
| 9 | Marigolds and daisies |
| ... | ... |
| c | A tasty dish |
| e | Two rounds of golf |
| n | A relaxing holiday |

Although this results in larger biometric information files, the increased redundancy reduces the risk of error by the recipient in determining the partial hash value or partial digital signature. It also makes the task of forging a biometric information file that much harder. Using a secret look up table and communicating in the biometric information files only the corresponding phrases of the codebook table and not the characters making up the partial hash value or partial digital signature effectively means that the partial hash value or partial digital signature is encrypted before being communicated in a biometric information file. Again this makes the forging of a biometric file more difficult.

The invention may be implemented on a number of different hardware platforms and devices using custom integrated circuits, Field Programmable Gate Arrays, special and general purpose processors using firmware and/or software.

One example of using the invention to authenticate a public encryption key is given by the iPhone™ App called S2S illustrated in FIG. 7. The App allows users to share digital files securely by encrypting each file using the public keys of the intended recipients and storing the resulting ciphertexts in a cloud type server. Using their iPhones™, the recipients download the ciphertexts and the App uses their private keys to decrypt the contents of the ciphertexts for display, local storage or for hand off to a PC or other device. A critical part of the secure operation of the App is the distribution of each user's public encryption key to a user's contacts and the authentication of the binding of a user's ID to their public key. During setup the App generates a public encryption key for each user and the partial hash value of the key is presented to the user who is invited to make an audio recording identifying himself/herself and enunciating the partial hash value as shown in FIG. 8. In the App the partial hash value is called Unique ID. The user starts the voice recording as shown in FIG. 9, and after recording their voice establishing their ID and including the spoken Unique ID (partial hash value) the user ends the recording as shown in FIG. 10. The public key together with the voice recording are sent to each contact of the user. Each contact on receiving the public key together with the voice recording is invited by the App to listen to the recording, to identify the speaker and to verify that the spoken Unique ID (partial hash value) is identical to the Unique ID (partial hash value) which the App locally calculates from the received public encryption key. Only if the authentication is satisfied does the contact user authorise the App to store the ID and associated public encryption key for future secure sharing of information.

It is apparent that the App could generate other biometric information files such as a video recording as described above as further proof of authentication.

In summary, the invention may be used in a wide number of different applications for access to digitally represented information such as cloud based information services, internet banking, digital rights management, personal information databases, social networking, point of sale transactions, e-mail applications, secure ticketing, message services, digital broadcasting, digital communications, wireless communications, video communications, magnetic cards and general digital storage.

REFERENCES

[1] R. Graubart and B. Abramowitz, Voice signature with strong binding, U.S. Pat. No. 7,606,768 B2, October 2009
[2] A. J. Menezes, P. C. van Oorschot and S. A. Vanstone, *Handbook of Applied Cryptography*, CRC Press, ISBN 0-8493-8523-7
[3] R. Rivest, A. Shamir, L. Adleman, *A Method for Obtaining Digital Signatures and Public-Key Cryptosystems*, Communications of the ACM 21 (2), pp. 120-126, 1978
[4] FIPS PUB 186-3, *Digital Signature Standard (DSS)*, Federal Information Processing Standards Publication.
[5] R. J. McEliece, *A Public-Key Cryptosystem based on Algebraic Coding Theory*, DSN Progress Report 42-44, 1978.
[6] M. Tomlinson and C. J. Tjhai, *Public key encryption system using error correcting codes*, UK Patent GB2473154, November 2010.

What is claimed is:

1. A method of authenticating one or more digital files associated with an originator of the one or more digital files, or a trusted third party, the method comprising:
   a) calculating a hash value of the one or more digital files using a cryptographic hash function;
   b) generating authentication data providing a binding of the one or chore digital files to at least one biometric characteristic of the associated originator or trusted third party, by:
      i) prompting the associated originator or trusted third party to record biometric input of at least a part of the calculated hash value, and
      ii) capturing audio and/or image data of the biometric input of the at least part of the calculated hash value by the associated originator or trusted third party in response to the prompting,
      wherein the at least part of the calculated hash value is implanted into the captured audio and/or image data of; and
   c) transmitting the one or more digital files and the associated generated authentication data to a recipient,
   whereby the implanted at least part of the calculated hash value and the at least one biometric characteristic of the associated originator or trusted third party are verified from an output of the generated authentication data.

2. A method according to claim 1, wherein the authentication data further comprises captured audio and/or image data of the biometric input of all or part of a hash value encoded using a codebook look up table where a symbol or sequence of symbols is substituted for each symbol representing all or part of a hash value.

3. A method according to claim 1, wherein the authentication data comprises a captured video recording of a person enunciating text which includes all or part of the calculated hash value.

4. A method according to claim 1, wherein the authentication data comprises a captured video recording of a person communicating a message, which includes all or part of the calculated hash value, using body gestures.

5. A method according to claim 1, wherein the authentication data comprises a captured photograph or a video recording of a person writing all or part of a hash value.

6. A method according to claim 5, wherein the authentication data further comprises captured data of the person signing their name.

7. A method according to claim 1, wherein the authentication data comprises a sound recording of a person enunciating text which includes all or part of a hash value.

8. A method according to claim 1, further comprising generating a plurality of authentication data to form a nested authentication arrangement whereby successive trusted third parties provide respective generated authentication data.

9. The method of claim 1, further comprising:
   generating a digital signature using said calculated hash value;
   wherein all or part of the digital signature is additionally implanted into said generated authentication data, by prompting the associated originator or trusted third party to record biometric input of at least a part of the calculated hash value and at least a part of the generated digital signature, and capturing audio and/or image data of the biometric input of the at least a part of the calculated hash value and the at least a part of generated digital signature by the associated originator or trusted third party in response to the prompting.

10. A method according to claim 9, wherein the authentication data further comprises captured audio and/or image data of the biometric input of all or part of a digital signature encoded using a codebook look up table where a symbol or sequence of symbols is substituted for each symbol representing all or part of a digital signature.

11. A method according to claim 9 in which the McEliece public key encryption system is used to create the digital signature and wherein the generated authentication data contains a plurality of bit error locations necessary to validate the digital signature.

12. A system for authenticating one or more digital files associated with an originator of the one or more digital files, or a trusted third party, comprising a processor configured to:
- calculate a hash value of the one or more digital files using a cryptographic hash function;
- generate authentication data providing a binding of the one or more digital files to at least one biometric characteristic of the associated originator or trusted third party, by:
  - prompting the originator or trusted third party to record biometric input of at least a part of the calculated hash value, and
  - capturing audio and/or image data of the biometric input of the at least part of the calculated hash value by the originator or trusted third party in response to the prompting,
  - wherein the at least part of the calculated hash value is implanted into the captured audio and/or image data; and
- transmit the one or more digital files and the associated generated authentication data to a recipient,
- whereby the implanted at least part of the calculated hash value and the at least one biometric characteristic of the originator or trusted third party are verified from an output of the generated authentication data.

13. A non-transitory computer-readable storage medium storing computer-executable instructions, that when executed perform a method of authenticating one or more digital files associated with an originator of the one or more digital files, or a trusted third party, by:
- calculating a hash value of the one or more digital files using a cryptographic hash function;
- generating authentication data providing a binding of the one or more digital files to at least one biometric characteristic of the associated originator or trusted third party, by:
  - prompting the originator or trusted third party to record biometric input of at least a part of the calculated hash value, and
  - capturing audio and/or image data of the biometric input of the at least part of the calculated hash value by the originator or trusted third party in response to the prompting, wherein the at least part of the calculated hash value is implanted into the captured audio and/or image data; and
- transmitting the one or more digital files and the associated generated authentication data to a recipient,
- whereby the implanted at least part of the calculated hash value and the at least one biometric characteristic of the originator or trusted third party are verified from an output of the generated authentication data.

* * * * *